United States Patent [19]

Kondo et al.

[11] E Patent Number: Re. 31,648

[45] Reissued Date of Patent: Aug. 21, 1984

[54] SYSTEM FOR GENERATING TONE SOURCE WAVESHAPES

[75] Inventors: Michio Kondo; Akira Nakada; Masanobu Chibana; Tsuyoshi Futamase; Akiyoshi Ohya, all of Hamamatsu, Japan

[73] Assignee: Nippon Gakki Seizo Kabushiki Kaisha, Hamamatsu, Japan

[21] Appl. No.: 328,261

[22] Filed: Dec. 7, 1981

Related U.S. Patent Documents

Reissue of:

[64] Patent No.: 4,119,005
Issued: Oct. 10, 1978
Appl. No.: 784,317
Filed: Apr. 4, 1977

U.S. Applications:

[63] Continuation of Ser. No. 116,583, Jan. 29, 1980, abandoned, which is a continuation of Ser. No. 619,557, Oct. 3, 1975, abandoned, which is a continuation-in-part of Ser. No. 448,573, Mar. 6, 1974, abandoned.

[30] Foreign Application Priority Data

Mar. 10, 1973 [JP] Japan ..... 48/28159

[51] Int. Cl.[3] ..... G10H 1/02; G10H 5/10

[52] U.S. Cl. ..... 84/1.01; 84/1.11; 84/1.13; 84/1.19; 84/1.26

[58] Field of Search ..... 84/1.01, 1.03, 1.11–1.13, 84/1.19–1.24, 1.26, 1.28, DIG. 29

[56] References Cited

U.S. PATENT DOCUMENTS

| | | | |
|---|---|---|---|
| 3,610,799 | 10/1971 | Watson | 85/1.01 |
| 3,610,805 | 10/1971 | Watson et al. | 84/1.28 X |
| 3,610,806 | 10/1971 | Deutsch | 84/1.26 |
| 3,683,096 | 8/1972 | Peterson et al. | 84/1.03 X |
| 3,697,661 | 10/1972 | Deutsch | 84/1.01 |
| 3,755,608 | 8/1973 | Deutsch | 84/1.01 |
| 3,789,719 | 2/1974 | Maillet | 84/1.03 X |
| 3,809,786 | 5/1974 | Deutsch | 84/1.01 |
| 3,809,788 | 5/1974 | Deutsch | 84/1.01 |
| 3,809,789 | 5/1974 | Deutsch | 84/1.01 |
| 3,809,790 | 5/1974 | Deutsch | 84/1.01 |
| 3,878,750 | 4/1975 | Kapps | 84/1.01 |
| 3,910,150 | 10/1975 | Deutsch et al. | 84/1.03 |

*Primary Examiner*—Stanley J. Witkowski
*Attorney, Agent, or Firm*—Spensley, Horn, Jubas & Lubitz

[57] ABSTRACT

The system comprises a frequency number memory device for storing information regarding the frequencies of respective tones, a keyboard switch for reading out frequency number information corresponding thereto from the memory device, an address generator including an adder for adding a predetermined number of the frequency number information thereby producing an address signal consisting of plural bits, address composers for processing the bits of the address signal and thereby composing digital tone signals constituting a saw-tooth, square and triangular waveshape, and digital-analog converters for converting the digital tone signals into analog tone signals, which are thereafter used to synthesize waveshapes of any tone.

17 Claims, 10 Drawing Figures

SYSTEM FOR GENERATING TONE SOURCE WAVESHAPES

Matter enclosed in heavy brackets appears in the original patent but forms no part of this reissue specification; matter printed in italics indicates the additions made by reissue.

This is a continuation of application Ser. No. *116,583 filed Jan. 29, 1980 (abondoned) which itself is an application for reissue of U.S. Pat. No. 4,119,005 issued Oct. 10, 1978 which patent issued from application Ser. No. 784,317 filed April 4, 1977, itself being a continuation of application Ser. No. 619,557* filed Oct. 3, 1975 [, and now abandoned, which is a continuation-in-part application of U.S. patent application Ser. No. 448,573 filed Mar. 6, 1974 (now abandoned)] *(abandoned) which in turn was a continuation-in-part of application Ser. No. 448,573 filed Mar. 6, 1974 (abandoned).*

BACKGROUND OF THE INVENTION

This invention relates to an electronic musical instrument, and more particularly, to a system of generating basic tone source waveshapes having frequencies corresponding to respective keys of the musical instrument by utilizing a digital circuit.

A conventional apparatus for generating a musical tone waveshape comprises a memory device which stores a particular musical tone waveshape and means for reading out the stored waveshape at selected rates for producing respective musical tone waveshape signals. However, in order to produce signals of various musical tone waveshapes it is necessary to provide a plurality of memory devices because it is necessary to use one memory device for each tone waveshape. In addition, the prior art apparatus cannot accurately form tone signals of any desired waveforms. According to one type of prior art muscial tone waveshape generating system, a fundamental wave and sinousoidal waves corresponding to respective higher harmonics are read out from a memory device in which a sinusoidal wave is stored and the read out fundamental and harmonic waves are compounded at suitable level ratios to form a musical tone signal of any desired waveshape. However, these prior art systems require a number of complicated circuit components such as a plurality of tone memories, memory read out devices and wave compounding devices. Thus, not only is the circuit construction extremely complicated and expensive but also it is necessary to use considerably high operating frequencies.

SUMMARY OF THE INVENTION

It is an object of this invention to provide an improved system for generating stable and highly accurate basic musical tone source waveshapes with an apparatus of small size and simple construction and operating at a relatively low frequency.

Another object of this invention is to provide a novel system for generating accurate basic tone source waveshapes with an simple apparatus without utilizing any waveshape memory device and without the necessity of synthesizing higher harmonic waveshapes.

Still another object of this invention is to provide a simple system for generating digital representations of stable basic tone source waveshapes having a saw-tooth, duty variable square or triangular configuration which can be used to produce any one of substantially all musical tone source signals by digital-to-analog conversion.

In accordance with this invention there is provided a system for generating tone source waveshapes comprising a frequency number memory device for storing information regarding the frequencies of respective tones; a keyboard switch for reading out frequency number information corresponding thereto from the frequency number memory device; an address generator responsive to the frequency number information read out from the frequency memory device for producing an address signal consisting of a plurality of bits; an address composer responsive to the address signal for composing a digital signal from at least one of the bits and having a saw-tooth, square or triangular waveshape, and means for converting the digital signal into an analog tone source signal which is used to produce a desired musical tone waveshape signal.

The address generator comprises an adder for successively adding the frequency number information for producing, as an address signal, a sum whose contents include a plurality of bits. To form a saw-tooth wave, the address composer is comprised by a buffer register for storing the data of a predetermined number of bits of higher orders from among the address signal.

The address composer for producing a symmetrical square wave includes inverter means connected to receive only the data of the most significant bit of the address signal.

The address composer for producing an asymmetrical square wave comprises an AND gate circuit connected to receive the data of the most significant bit of said plurality of bits and the data of a bit one order lower than the most significant bit, and inverter means responsive to the output of the AND gate circuit.

The address composer for producing a triangular wave comprises a buffer memory connected to receive the data of a predetermined number of bits at higher orders among said plurality of bits, a selector, means for applying the data of the predetermined number of the bits except the data regarding the most significant bit and a bit one order lower than the most significant bit directly to and through inverter means to the selector, means for controlling the selector in accordance with the bit one order lower than the most significant bit, a complementing means responsive to the output from the selector for forming a complement with respect to 2, and means for controlling the complementing means in accordance with the most significant bit.

BRIEF DESCRIPTION OF THE DRAWINGS

In the accompanying drawings:

FIGS. 4a and 4b show block diagrams of different duty variable square wave address generators in which FIG. 4a shows a symmetrical square wave address composer and FIG. 4b an asymmetrical square wave address composer;

DESCRIPTION OF THE PREFERRED EMBODIMENTS

Figure 1:
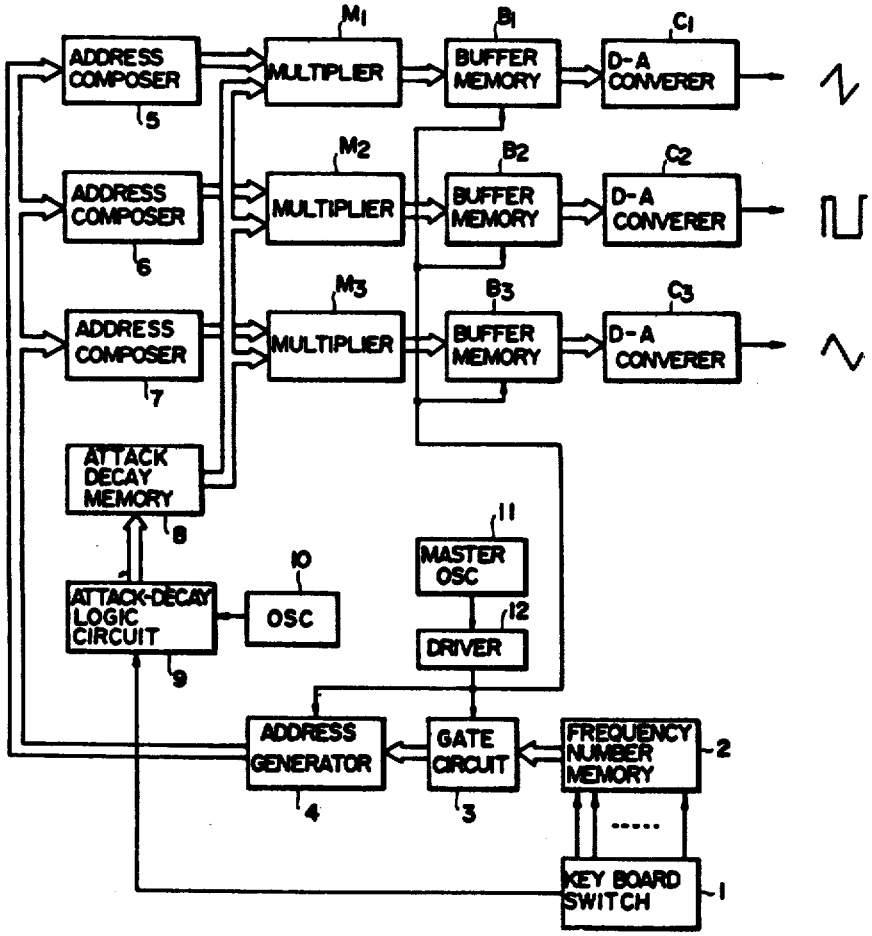
FIG. 1 is a block diagram showing one embodiment of this invention.

With reference now to the accompanying drawings, a preferred embodiment of the novel tone source waveshape generating system shown in FIG. 1 comprises a pre-loaded frequency number memory device 2 which stores information corresponding to the frequencies of respective musical tones. In the following description the information is termed "F numbers." When any one of a plurality of keys of a keyboard switch circuit 1 is operated, an F number corresponding to that key is read from the frequency number memory device 2. The values of the F numbers are determined, for example, as shown in the following Table 1, which shows the relationship between the fundamental frequency fh, F number and the number N of sampling points in each period for various musical notes ranging from the C tone ($C_6$) of the sixth octave to the C tone ($C_7$) of the seventh octave.

TABLE 1

| Tone | Frequency fh ($H_2$) | F number | Number(N) of Sampling points in each period |
|---|---|---|---|
| $C_7$ | 2093.00 | 1.0000 | 32.00 |
| $B_6$ | 1975.53 | 0.9443 | 33.90 |
| $A_{q6}$ | 1864.66 | 0.8913 | 35.92 |
| $A_6$ | 1760.00 | 0.8412 | 38.06 |
| $G_{q6}$ | 1661.22 | 0.7940 | 40.32 |
| $G_6$ | 1567.98 | 0.7494 | 42.72 |
| $F_{q6}$ | 1479.98 | 0.7073 | 45.26 |
| $F_6$ | 1396.91 | 0.6676 | 47.95 |
| $E_6$ | 1318.51 | 0.6301 | 50.80 |
| $D_{q6}$ | 1244.51 | 0.5947 | 53.82 |
| $D_6$ | 1174.66 | 0.5613 | 57.02 |
| $C_{q6}$ | 1108.73 | 0.5298 | 60.41 |
| $C_6$ | 1046.50 | 0.5000 | 64.00 |

The F number read from the frequency number memory device 2 is applied to an address generator 4 through a gate circuit 3 which is enabled for a unit time tx at each sampling point of the wave. More particularly, a driver amplifier 12 generates a drive signal in accordance with a clock signal generated by a master oscillator 11 and having a period $t_x$, thus enabling the gate circuit 3 for each unit time $t_x$. The unit time $t_x$ at each sampling point of a tone source wave is determined by the frequency fh of the tone source wave and the number N of sampling points at each period. Since $t_x=(1/fhN)$(sec), in the case shown in Table 1 the unit time is expressed by $t_x=14.9$ microseconds. The relationship between the unit time $t_x$ at each sampling point and the sum qF of the F numbers accumulated by an F number adder 4A to be described later is shown in the following Table 2 in which the tones $A_{\#6}$, $G_6$ and $C_7$ are selected as examples. As can be noted from Table 2, 32 sampling points each designated by a respective value of qF are required to form one period of tone $C_7$, approximately 36 sampling points for tone $A_{\#6}$, and approximately 43 sampling points for tone $G_6$, thus indicating that a high number of sampling points is required to form tones of lower frequency levels. The keyboard switch circuit 1 and the frequency number memory 2 of FIG. 1 have acquired a well-known status in the art as exemplified by Deutsch U.S. Pat. No. 3,809,786 (see elements 12 and 14 of FIG. 1 therein)

TABLE 2

| Unit time $t_x$ at each sampling point | qF | | |
|---|---|---|---|
| | $G_6$ | $A_{q6}$ | $C_7$ |
| 1 | 0.7494 | 0.8913 | 1.0000 |
| 2 | 1.4988 | 1.7826 | 2.0000 |
| 3 | 2.2482 | 2.6739 | 3 |
| 4 | 2.9976 | 3.5652 | 4 |
| 5 | 3.7470 | 4.4565 | 5 |
| 6 | 4.4964 | 5.3478 | 6 |
| — | — | — | — |
| — | — | — | — |
| 31 | 23.2311 | 27.6303 | 31.0000 |
| 32 | 23.9808 | 28.5216 | 0.0000 |
| 33 | 24.7300 | 29.4129 | 1.0000 |
| 34 | 25.4796 | 30.3042 | 2 |
| 35 | 26.2290 | 31.1955 | 3 |
| 36 | 26.9784 | 0.0868 | 4 |
| 37 | 27.7278 | 0.9781 | 5 |
| 38 | 28.4772 | 1.8694 | 6 |
| 39 | 29.2262 | 2.7607 | 7 |
| 40 | 29.9760 | 3.6520 | 8 |
| 41 | 30.7254 | 4.5433 | 9 |
| 42 | 31.4748 | 5.4346 | 10 |
| 43 | 0.2242 | 6.3259 | 11 |
| 44 | 0.9736 | 7.2172 | 12 |
| 45 | 1.7230 | 8.1025 | 13.0000 |

Figure 2:
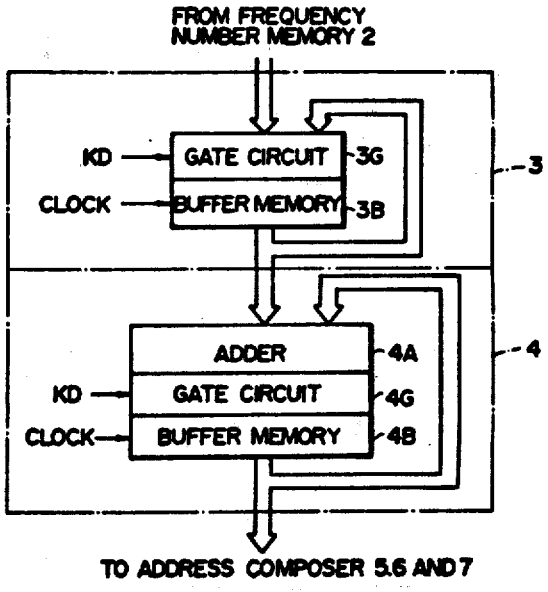
FIG. 2 is a block diagram showing one example of a gate circuit and an address generator.

FIG. 2 is a block diagram showing the construction of one example of the gate circuit 3 and the address generator 4. The data regarding each F number are constituted by 16 bits corresponding to the decimal value of the respective F number shown in Table 1. The F number is applied to one input of the gate circuit 3G, and this gate circuit is enabled under the command of key data KD which have a predetermined level only while a key is being depressed, thereby storing the F number in a 16 bit buffer memory 3B. While said key is being depressed, the output from the buffer memory 3B is fed back to the gate circuit 3G thus maintaining the same value of the F number. The output from the gate circuit 3 is coupled to the address generator 4 and the F number is successively added to itself so as to be accumulated as value qF(q=1, 2 . . . ) in a 21 bit adder 4A. The gate circuit 4G is enabled under the command of the key data KD so as to send the value qF to a buffer memory 4B, and the output from the buffer memory 4B is fed back to the adder 4A and also applied to the inputs of respective address composers 5, 6 and 7 as the output from the address generator 4.

The nature of "q" is precisely the same as that of "q" described in the aforementioned Deutsch U.S. Pat. No. 3,809,786 in connection with his frequency number R, whereas the present inventors use "q" in connection with their frequency number F. Thus, applicants' qF numbers are the qR numbers of the Deutsch Patent. Assuming that the value qF at this time is equal to the value of the $C_7$ tone at the time $t_x=1$ shown in Table 2, then qF=1. While the same key as described above is being depressed, the value qF which has been stored in the buffer memory 4B is fed back to the adder 4A to be added therein to the value of an F number sent from the gate circuit 3 and the resulting value qF is applied to the inputs of the address composers 5, 6 and 7 via the gate circuit 4G and the buffer memory 4B. In this example, at this time $t_x=2$ and the accumulated value of the F numbers for the $C_7$ tone is $qF=2$. The accumulation operation of the F numbers is carried out in a manner just described with the result that the F numbers are successively accumulated at each unit time $t_x$, and the values qF as shown in Table 2 are generated by the address generator 3. Each time the value qF exceeds 32, the adder 4A is reset to repeat the accumulation operation. Consequently, the resetting of the adder 4A is performed always near the end of each period of the generated tone source waves.

Address composers 5, 6 and 7 respectively deliver composed or changed address signals, at each sampling point of time, thereby constituting the three types of tone source waveshapes, that is, a saw-tooth wave, a duty variable square wave and a triangular wave. Since these address signals themselves respectively make the instantaneous values of the respective waveshapes, higher harmonic amplitude value calculating circuits of complicated construction are not required in this invention. *The address composer means does not utilize a waveshape memory for this digital waveshape composition.*

Figure 3:
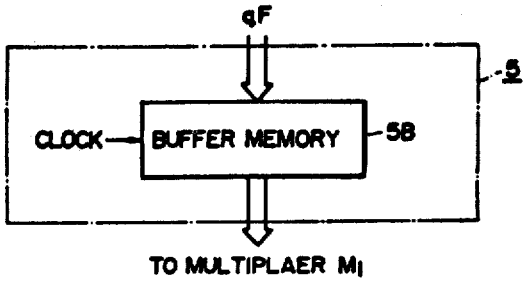
FIG. 3 is a block diagram showing one example of a saw-tooth address composer.
Figure 6A:
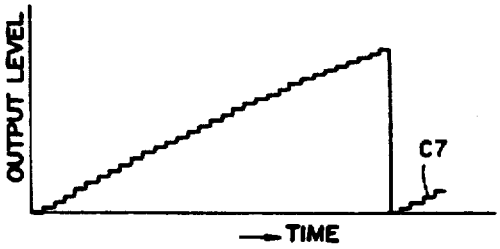
FIG. 6a shows a tone source signal having a saw-tooth waveshape and produced by a saw-tooth wave address composer.
Figure 6B:
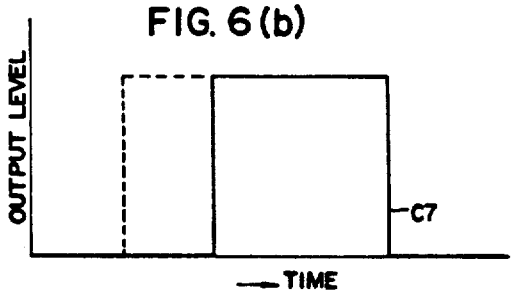
FIG. 6b shows a tone source signal having a square waveshape and produced by square wave address composer.
Figure 6C:
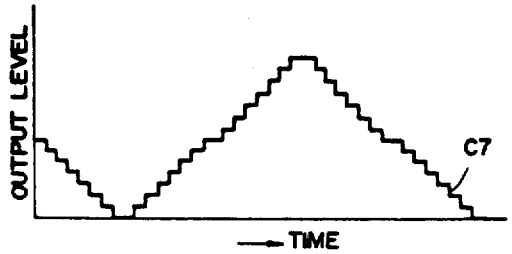
FIG. 6c shows a tone source signal having a triangular waveshape and generated by a triangular wave address composer.

FIG. 3 shows a block diagram of one example of the saw-tooth wave address composer 5. The value qF calculated by the adder 4A contains 21 bits but since the less significant bits can be discarded as a fraction portion, the data of the 11 bits at higher orders from the 21st bit to the 11th bit are used as the address signals for composing a basic tone source waveshape. The data of the 11 bits of higher (more significant) order of the value qF are applied to a buffer memory 5B to form a saw-tooth wave as shown in FIG. 6a. Since FIGS. 6a, 6b and 6c are plotted for the $C_7$ tone, for example, the number of the sampling points during one period is 32.

Figure 4:
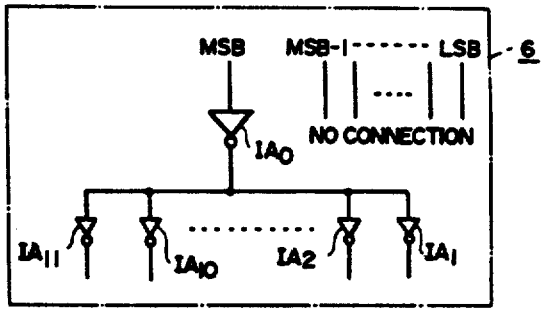
Figure 4:
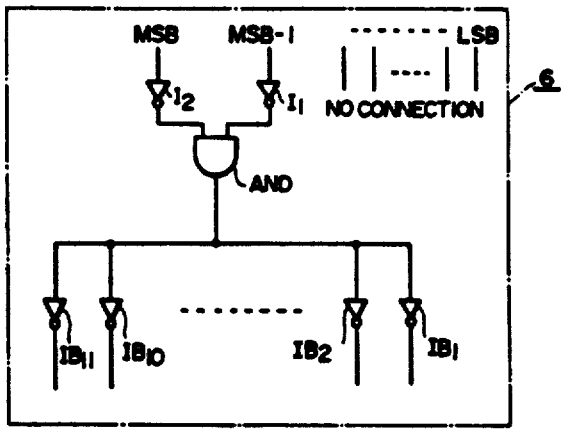

FIGS. 4a and 4b show examples of duty variable square wave address composers. FIG. 4a shows one example of a symmetrical square wave address composer suitable for use as the waveshape address composer 6 of FIG. 1 in which is utilized only the MSB data regarding the most significant bit of the sum value qF sent from the address pulse generator 4.

The term "MSB" is well-known in the field of digital technology. Taking the 21 bit output (plurality of bits) of address generator 4, for example, the MSB is the bit of the highest order and is followed directly by the bit which is one bit less significant and so on to the LSB. The address composer 6 in the form shown in FIG. 4a includes inverters $IA_{11}$, $IA_{10}$, $IA_9 \ldots IA_2$, $IA_1$. In the case of a $C_7$ tone, since the data of the most significant bit MSB up to the 16th sampling point are "0," the outputs from all inverters $IA_1 \ldots IA_{11}$, are zero, and this constitutes the output data for the 11 bits of the square wave address composer 6. From the 17th to the 32nd sampling point, the data of the most significant bits MSB are all "1". Accordingly, the outputs of all inverters $IA_1$ to $IA_{11}$ are 1 and correspond to the largest amplitude. Thus, it is possible to obtain a symmetrical square wave as shown by solid lines in FIG. 6b. Although in FIG. 6b, a waveshape for the $C_7$ tone is shown by way of example, it can be noted from Table 2 that for any tone, during the first half of the group of the sampling points, the data of the most significant bits are "0" whereas during the second half the data of the most significant bit are "1".

FIG. 4b shows a block diagram of one example of an asymmetrical square wave address composer suitable for use as the waveshape address composer 6 of FIG. 1. In this composer only the data of the most significant bit MSB and of the next bit MSB-1 (a bit one order lower than MSB) of the value qF are applied to inverters $I_2$ and $I_1$ respectively, and the outputs of these inverters are applied to the inputs of an AND gate circuit AND. The data of the most significant bit MSB, next bit MSB-1 and the output data from the AND gate circuit AND are related to each other as shown in Table 3 below.

TABLE 3

| | | MSB | MSB-1 | AND OUTPUT |
|---|---|---|---|---|
| Sampling period | $S_1$ | 0 | 0 | 1 |
| | $S_2$ | 0 | 1 | 0 |
| | $S_3$ | 1 | 0 | 0 |
| | $S_4$ | 1 | 1 | 0 |

In this table, $S_1$ represents sampling points during the first quarter period of one cycle, $S_2$ those during the second quarter period of one cycle, $S_3$ those during the third quarter period of one cycle and $S_4$ those during the fourth quarter period of one cycle. In the case of tone $C_7$, $S_1$ represents sampling points up to the 8th sampling point, $S_2$ those from the 9th to the 16th sampling point, $S_3$ those from the 17th to the sampling point 24th and $S_4$ those from the 25th to the 32nd sampling point. The output data from AND gate circuit AND are inverted by inverters $IB_1$–$IB_{11}$ to form an 11 bit output of the duty variable square wave address composer 6, thereby producing an asymmetrical square wave as shown by broken lines in FIG. 6b. In other words, where the output from the AND gate circuit AND is "1," the outputs from all of the inverters $IB_1$–$IB_{11}$ are "0" so that the amplitude for the wave of the sampling period $S_1$ is a minimum or zero. Where the output data from the AND gate circuit are "0," the outputs from all of the inverters $IB_1$–$IB_{11}$ are "1" so that the amplitude of the wave during sampling periods $S_2$, $S_3$ and $S_4$ is at a maximum. In this manner, an asymmetrical square wave having a duty factor ratio of 1:3 is obtained.

Figure 5:
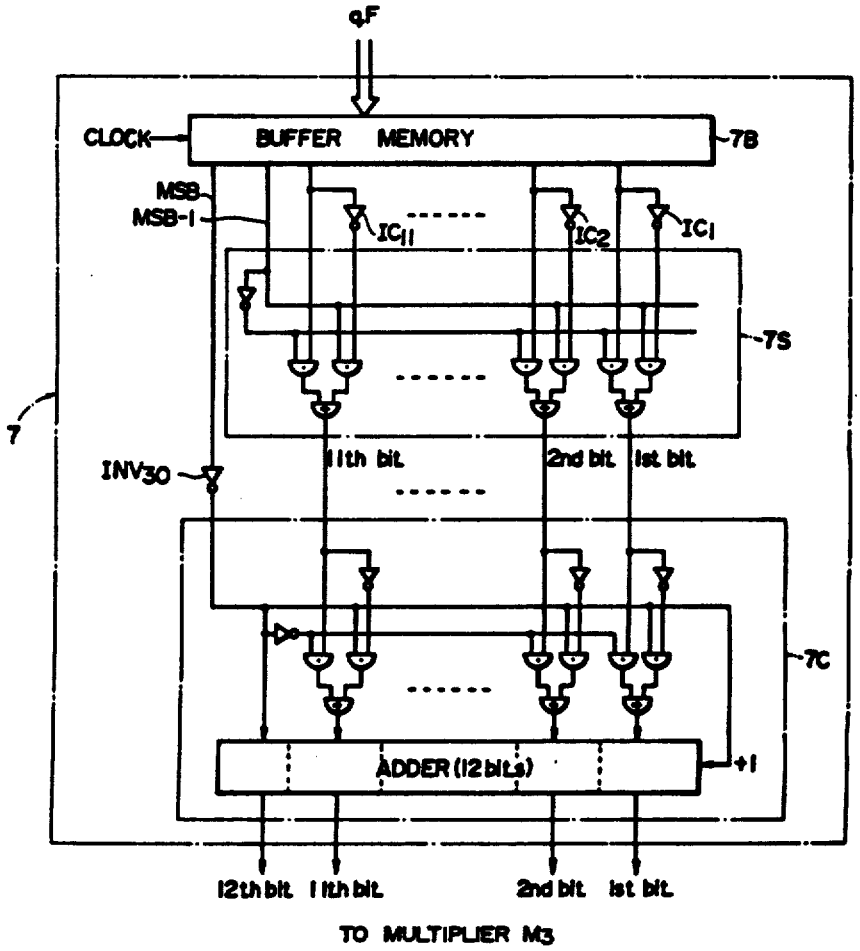
FIG. 5 is a block diagram showing one example of a triangular wave address composer.

FIG. 5 is a block diagram showing one example of a triangular wave address composer suitable for use as the wave shape address composer 7 of FIG. 1, in which the data represented by 13 bits of higher orders of the value qF are applied to a buffer memory 7B from address generator 4. Among the output data represented by the 13 bits from the buffer memory 7B, the data represented by the 11 bits of lower orders are respectively divided into two parts, one being sent directly to a selector 7S and the other being inverted by inverters $IC_1$–$IC_{11}$ and then applied to a selector 7S. The data of the 12th bit provided by the buffer memory 7B acts as a selection signal for commanding whether the data of the 11 bits from the buffer memory 7B or the data of the 11 bits inverted by the inverters $IC_1$–$IC_{11}$ are to be selected by selector 7S.

The selector 7S is a simple logic circuit provided for selectively applying, in response to the contents of buffer memory 7B which are one bit less significant than the MSB of the buffer memory (i.e., MSB-1), the contents of the buffer memory which are less significant than MSB-1 directly to complementor 7C or the outputs of inverters $IC_1$–$IC_{11}$ to complementor 7C. There is also provided a complementor 7C for providing a complement with respect to 2 for the data sent from the selector 7S. The output data from buffer memory 7B representing the 13th bit is inverted by an inverter $INV_{30}$ and the inverted signal is used to operate the complementor 7C.

The complementor 7C is a simple logic circuit provided for producing two's complements of the data from selector 7S. When the MSB of buffer memory 7B is "0", complementor 7C performs a complementing operation upon receipt of the output "1" of inverter $INV_{30}$, whereas it does not perform the complementing operation but passes the output of selector 7S upon receipt of the output "0" of inverter $INV_{30}$. By way of an example, the variation in the digital values of the 10th to 13th bits at higher orders is shown in Table 4 below.

TABLE 4

| | | Output data from buffer memory 7B | | | | Output data from selector 7S | | Output data from complementer 7C | | |
|---|---|---|---|---|---|---|---|---|---|---|
| Bit | | 13 | 12 | 11 | 10 | 11 | 10 | 12 | 11 | 10 |
| Sampling period | | 0 | 0 | 0 | 0 | 0 | 0 | 0 | 0 | 0 |
| | | 0 | 0 | 0 | 1 | 0 | 1 | 1 | 1 | 1 |
| | $S_1$ | 0 | 0 | 1 | 0 | 1 | 0 | 1 | 1 | 0 |
| | | 0 | 0 | 1 | 1 | 1 | 1 | 1 | 0 | 1 |
| | | 0 | 1 | 0 | 0 | 1 | 1 | 1 | 0 | 1 |
| | | 0 | 1 | 0 | 1 | 1 | 0 | 1 | 1 | 0 |
| | $S_2$ | 0 | 1 | 1 | 0 | 0 | 1 | 1 | 1 | 1 |
| | | 0 | 1 | 1 | 1 | 0 | 0 | 0 | 0 | 0 |
| | | 1 | 0 | 0 | 0 | 0 | 0 | 0 | 0 | 0 |
| | | 1 | 0 | 0 | 1 | 0 | 1 | 0 | 0 | 1 |
| | $S_3$ | 1 | 0 | 1 | 0 | 1 | 0 | 0 | 1 | 0 |
| | | 1 | 0 | 1 | 1 | 1 | 1 | 0 | 1 | 1 |
| | | 1 | 1 | 0 | 0 | 1 | 1 | 0 | 1 | 1 |
| | | 1 | 1 | 0 | 1 | 1 | 0 | 0 | 1 | 0 |
| | $S_4$ | 1 | 1 | 1 | 0 | 0 | 1 | 0 | 0 | 1 |
| | | 1 | 1 | 1 | 1 | 0 | 0 | 0 | 0 | 0 |

Sampling periods $S_1$, $S_2$, $S_3$ and $S_4$ are identical to those shown in Table 3 and can be obtained by dividing one cycle by 4. Where the value of the 12th bit provided by the buffer memory 7B is "1," the selector 7S is caused to select the data inverted by the inverters $IC_1$–$IC_{11}$. Consequently, inverted data are obtained during sampling periods $S_2$ and $S_4$ as shown in Table 4. Where the value of the 13th bit is "0," the output "1" from the inverter $IC_0$ operates the complementor 7C, and where its output is "0" the output data from the selector 7S also constitutes the output from the complementor 7C. During sampling periods $S_1$ and $S_2$, since the value of the 13th bit is "0," the complementor 7C is caused to produce a complement of 2 of the output data from selector 7S. A complement of 2 regarding a numeral Y represents $-Y$. Further, as can be noted from Table 4, the absolute values of the corresponding data during sampling periods shown in the columns under the heading of "output data from selector 7S" in Table 4 are equal to each other. As a result, the output data from the complementor 7C have the same absolute value, but of opposite signs with regard to the corresponding sampling points during respective sampling periods. For example, the binary word 111 is a complement of 2 for the binary word 001. The binary word 001 corresponds to decimal 1, hence the complement 111 of 2 represents decimal 1. Among the output data of 12 bits provided by the complementor 7C, the most significant bit is used as a sign bit. In this manner, a triangular wave as shown in FIG. 6C can be produced.

In summary, address generator 4 responds to the frequency number F read out from frequency number memory device 2 to produce a given number of successive address signals periodically. For example, for each period of the note $C_7$ (F=1.0000), 32 qF signals are produced, each of the 32 qF signals having a 21 bit plurality of bits. Address composer 5 responds 32 successive times to the digital word value, at each time, of 11 bits of each 21 bit qF signal to digitally compose the sawtooth waveshape having the amplitude versus time characteristic shown in FIG. 6(a) and the fundamental frequency of the note $C_7$. Address composer 6 responds 32 successive times to the digital word value, at each time, of 1 bit of each 21 bit qF signal to digitally compose the symmetrical square waveshape having the amplitude versus time characteristic shown by solid lines in FIG. 6(b) and the fundamental frequency of the note $C_7$; and responds 32 successive times to the digital word value, at each time, of 2 bits of each 21 bit qF signal to digitally compose the assymmetrical square waveshape having the amplitude versus time characteristic shown by broken lines in FIG. 6(b) and the fundamental frequency of the note $C_7$. Address composer 7 responds 32 successive times to the digital word value, at each time, of 13 bits of each 21 bit of qF signal to digitally compose the triangular waveshape having the amplitude versus time characteristic shown in FIG. 6(c) and the fundamental frequency of the note $C_7$. Thus, for the note $C_7$, each address composer responds 32 successive times to the digital word value of a respective predetermined number (11, 1, 2 or 13) of a 21 bit plurality of bits, which predetermined number is in the range from 1 bit to 13 bits. Stated more generally, each address composer is responsive to a predetermined number of the plurality of bits of each address signal, which predetermined number is in the range from 1 bit to n bits, where n is more than 1 and less than the bit plurality.

In the foregoing description, the methods of synthesizing digital data for basic tone source waveforms of three types have been shown. *This is done by digital logic circuitry means for forming sample point amplitude values, without the use of a waveform memory, by manipulation of the digital address values qF themselves.* In the following, a method of forming an attack-decay envelope for these data will be described.

Figure 7:
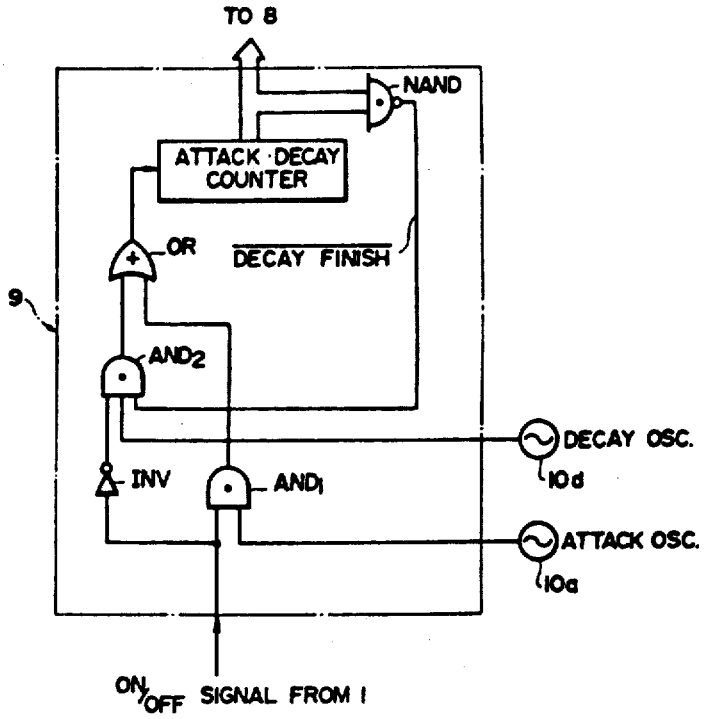
FIG. 7 is a block diagram showing in detail the attack-decay logic circuit of the embodiment shown in FIG. 1.

The closure of a key-actuated switch in the keyboard switch circuit 1 is detected by an attack-decay logic circuit 9 (FIGS. 1 and 7). In response to the signal representing the closure of the keyboard switch and the output from an attack-decay oscillator 10, the attack-decay logic circuit 9 produces an address signal for reading the data out of an attack-decay memory 8 which stores digital information regarding the contour of an attack-decay envelope. In response to the address signal generated by the attack-decay logic circuit 9 the data regarding the attack envelope are read from the attack-decay memory 8 during a suitable interval following the closure of the keyboard switch. The intervals of attack and decay are controlled by the attack-decay oscillator 10. These data are applied to multiliers $M_1$, $M_2$ and $M_3$ for multiplying with the digital data regarding respective note source waveshapes applied from waveshape address composers 5, 6 and 7. Even after termination of the attack, while the keyboard switch is held closed, the terminal values of the attack envelope are read out. When the attack-decay logic circuit 9 detects the opening of the keyboard switch, the data regarding a decay envelope is read from the attack-decay memory 8 in the same manner as in the case of the attack envelope and these read out data are applied to the multipliers $M_1$, $M_2$ and $M_3$ for multiplying the digital data regarding the tone source waveshapes.

Stated more specifically, upon depression of any key, an ON signal is applied to one input of the lower AND gate AND 1 which causes the ATTACK OSC 10a. to produce an output pulse. This pulse is applied to the ATTACK DECAY COUNTER via the lower AND gate AND 1 and the OR gate. The ATTACK DECAY COUNTER then performs a binary counting operation and its count output is applied to the attack decay memory 8. In the meantime, the output "0" of the inverter is applied to one input of the other AND gate AND 2 whereby the pulse of the DECAY OSC. is inhibited and not applied to the ATTACK DECAY COUNTER. Upon release of the key, an OFF signal "0" is applied to the lower AND gate AND 1 so that it does not gate out the output pulse of the ATTACK OSC. Since the output of the inverter meanwhile becomesa "1," the output pulse of the DECAY OSC. is applied to the ATTACK DECAY COUNTER via said other AND gate AND 2 and the OR gate and is counted. When decay has finished, all inputs to the NAND circuit becomes "1" so that the DECAY FINISH signal becomes "0" and said other AND gate AND 2 ceases to gate out the output pulse of the DECAY OSC.

The digital data regarding the tone source waveshapes which have been multiplied by the amplitude coefficients from the attack-decay memory 8 in the multipliers $M_1$, $M_2$ and $M_3$, respectively, are applied to buffer memories $B_1$, $B_2$ and $B_3$ for equalizing the fluctuations in time. The outputs from the buffer memories $B_1$, $B_2$ and $B_3$ are sent to digital-analog converters $C_1$, $C_2$ and $C_3$, respectively, and converted into analog signals therein. In this manner, the three types of tone source waveshapes namely a saw-tooth wave, duty variable square wave and triangular wave are produced as analog signals.

Although the foregoing description has been made with reference to a monophonic instrument, it will be clear that tone source waveshapes for a polyphonic instrument can also be formed in the same manner. Furthermore, it should be understood that the clock signals applied to the address generator 4 and the address composer 5, 6 and 7 are generated by the single master oscillator 11. Consequently, it is possible to obtain extremely stable tone source waveshapes.

By analog processing the digitally represented tone source waveshapes produced in the manner described hereinabove it is possible to synthesize almost all musical tone waveshapes. It is also possible to use these tone source waveshapes as the fundamental waves in a compound tone synthesizer. Thus, according to this invention, it is possible to digitally form highly accurate and stable tone source waveshapes with a small size apparatus operating at a low frequency without using any waveform memory device and without the necessity of synthesizing higher harmonic components.

What is claimed is:

1. A system for generating tone source waveshapes comprising a pre-loaded frequency number memory device which stores in digital representation a plurality of frequency numbers corresponding respectively to the fundamental frequencies of the notes of said waveshapes; a keyboard switch circuit having a key-actuated switch for each of said notes for reading out a frequency number respectively corresponding thereto from said frequency memory device; an address generator responsive to the frequency number read out from said frequency memory device for producing a given number of successive address signals periodically, each address signal consisting of a plurality of bits; at least one address composer connected to receive said successive address signals from said address generator directly and responsive to a predetermined number of said plurality of bits of each address signal in the range from one bit to n bits, where n is more than one and [less] *not more* than the bit plurality, for digitally composing a tone waveshape having a fundamental frequency corresponding to said read out frequency number with an amplitude versus time characteristic determined by the digital word value of each predetermined number of address signal bits to which said one address composer responds; and means for converting the digitally composed tone waveshape into an analog equivalent thereof.

2. The system according to claim 1 wherein said address generator includes an adder for successively adding the read-out frequency number to itself and a buffer memory for storing the accumulated frequency number resulting from the successive addition performed by said adder.

3. The system according to claim 2 wherein said buffer memory stores said accumulated frequency number in the form of a plurality of bits, and said address composer comprises a buffer memory for storing a predetermined number of bits counting from the most significant bit in said address signal, thereby producing a saw-tooth wave.

4. The system according to claim 1 wherein said address composer is a duty variable square wave address generator.

5. The system according to claim 2 wherein said buffer memory stores said accumulated frequency number in the form of a plurality of bits and said address composer includes inverter means connected to receive only the most significant bit of said address signal, thereby producing a symmetrical square wave.

6. The system according to claim 2 wherein said buffer memory stores said accumulated frequency number in the form of a plurality of bits and said address composer comprises an AND gate circuit connected to receive the most significant bit of said address signal and a bit which is one bit less significant than said most significant bit, and inverter means responsive to the output of said AND gate circuit, thereby producing an asymmetrical square wave.

7. The system according to claim 2 wherein said buffer memory stores said accumulated frequency number in the form of a plurality of bits and wherein said address composer comprises a second buffer memory connected to receive a predetermined number of bits counting from the most significant bit in the address signal, inverter means, a selector for applying said predetermined number of the bits except the most significant bit and the bit which is one bit less significant than said most significant bit directly to and through said inverter means to said selector, means for controlling said selector in accordance with said bit which is one bit less significant than said most significant bit, complementing means responsive to the output from said selector for forming a two's complement, and means for controlling said complementing means in accordance with said most significant bit, thereby forming a triangular wave.

8. The system according to claim 1 which further comprises an attack-decay oscillator, an attack-decay logic circuit responsive to a signal indicating the operation of said key-actuated switch and the output from said attack-decay oscillator for producing an address signal, an attack-decay memory device storing information regarding attack and decay envelopes and connected to receive [said] *the* address [signals] *signal from the attack/decay logic circuit* for producing said attack and decay envelope information, and a multiplier connected between said address composer and said digital-analog converting means for multiplying said digital tone signal by said attack and decay envelope information.

*9. In an electronic musical instrument having note selection keys, a system for generating tone source waveshapes comprising:*

*key identification means having a key-actuated switch for each note for generating a key identification signal corresponding thereto;*

*address generator means responsive to the key identification signal for producing a given number of successive address signals periodically, each address signal consisting of a plurality of bits;*

*address composer means connected to receive said successive address signals from said address generator means, and responsive to a predetermined number of said plurality of bits of each address signal in the range from one bit to n bits where n is more than one and not more than the bit plurality, for digitally composing a tone waveshape having a fundamental frequency corresponding to said generated key identification signal with an amplitude versus time characteristic determined by the digital word value of each predetermined number of address signal bits to which said address composer means responds, said address composer means not utilizing a waveshape memory for said digital waveshape composition; and*

*means for converting the digitally composed tone waveshape into an analog equivalent thereof.*

*10. The system according to claim 9 further comprising:*

*an attack-decay clock generator,*

*envelope information means, responsive to a signal indicating the opration of a key-actuated switch and to clock pulses from said attack-decay clock generator, for providing information regarding attack and decay envelopes, and*

*waveform modification means, cooprating with said envelope information means and said address composer means, for modifying said digitally composed waveshape in accordance with said information regarding attack and decay envelopes.*

*11. A system for generating tone source waveshapes comprising:*

*means for generating key identification signals in digital representation corresponding respectively to note-related fundamental frequencies of said waveshapes;*

*a keyboard switch circuit having a key-actuated switch for each of said notes for actuating said generating means to generate the key identification signal corresponding thereto;*

*an address generator responsive to the key identification signal for producing a given number of successive address signals periodically, each address signal consisting of a plurality of bits;*

*an address composer, connected to receive said successive address signals from said address generator and responsive to a predetermined number of said plurality of bits of each address signal in the range from one bit to n bits where n is more than one and not more than the bit plurality, for digitally composing a tone waveshape solely by carrying out arithmetic and/or logical operations directly on said predetermined number of address signal bits, said tone waveshape having a fundamental frequency corresponding to said generated key identification signal with an amplitude versus time characteristic determined by the digital word value of each predetermined number of address signal bits to which said address composer responds; and*

*means for converting the digitally composed tone waveshape into an analog equivalent thereof.*

*12. The system according to claim 11 which further comprises an attack-decay oscillator, an attack-decay logic circuit responsive to a signal indicating the operation of said key-actuated switch and the output from said attack-decay oscillator for producing an address signal, an attack-decay memory device storing information regarding attack and decay envelopes and connected to receive the address signal from the attack-decay logic circuit for producing said attack and decay envelope information, and a multiplier connected between said address composer and said digital-analog converting means for multiplying said digital tone signal by said attack and decay envelope information.*

*13. An electronic musical instrument comprising:*

*means for producing a set of digital addresses which progress through a fixed range of values in a certain time interval corresponding to the period of a selected musical note, and*

*digital logic circuitry means for forming waveform sample point amplitude values, without the use of a waveform memory, by manipulation of the digital address values themselves, said manipulation being carried out in unison with the progressive changes in digital address value so that the resultantly formed musical waveform has the period of said selected note.*

*14. An electronic musical instrument according to claim 13 further comprising:*

*a keyboard, said selected musical note being selected by actuation of a key,*

*an attack-decay clock generator,*

*envelope information means, responsive to said key actuation and to clock pulses from said generator, for providing information regarding attack and decay envelopes, and*

*waveform modification means, cooperating with said envelope information means and said digital logic circuitry means, for modifying said manipulation in accordance with said information regarding attack and decay envelopes.*

*15. An electronic musical instrument according to claim 13 wherein said manipulation consists of logical manipulation.*

*16. An electronic musical instrument according to claim 13 wherein said manipulation consists of arithmetic manipulation.*

*17. An electronic musical instrument according to claim 13 wherein said manipulation consists of combined logical and arithmetic manipulation.*

* * * * *